Dec. 5, 1933.    F. MARAS ET AL    1,938,079
LIQUID LEVEL GAUGE
Filed March 15, 1932
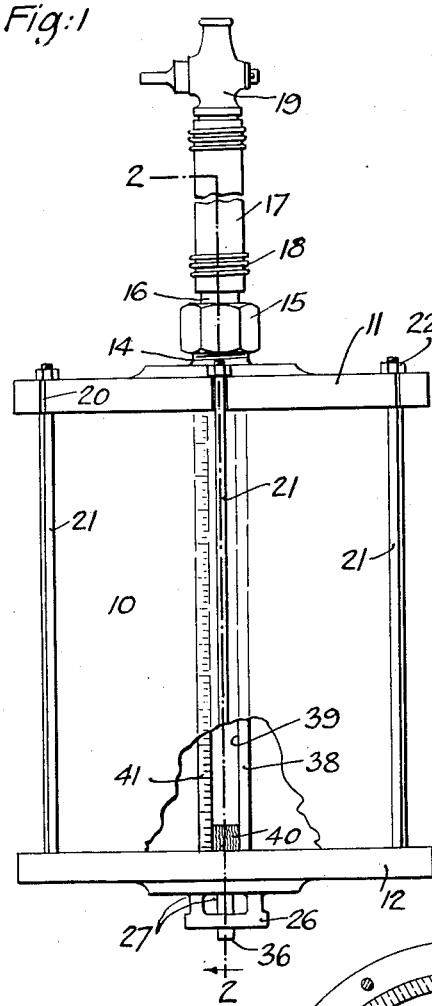
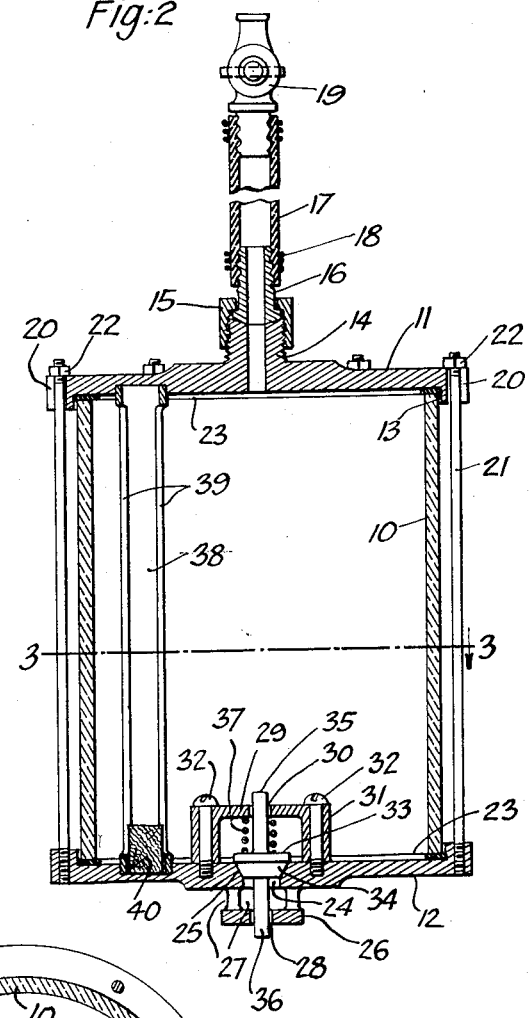
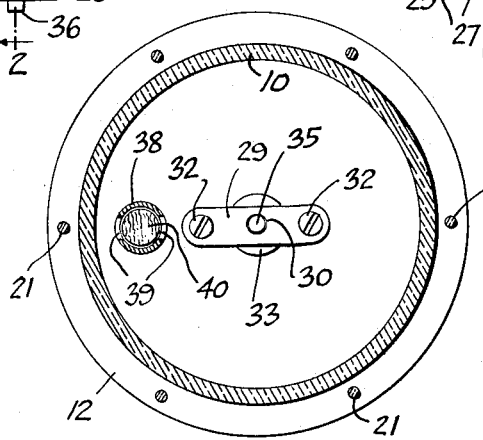
FRANK MARAS
HYNEK MARAS
EDWARD KOMAREK
INVENTORS
BY Walter E. Wollheim
ATTORNEY Patented Dec. 5, 1933

1,938,079

UNITED STATES PATENT OFFICE 1,938,079

LIQUID LEVEL GAUGE

Frank Maras, Hynek Maras, and Edward Komarek, Long Island City, N. Y.

Application March 15, 1932. Serial No. 598,918

1 Claim. (Cl. 73—120)

This invention relates to testing apparatus for fuel tanks and has for its particular object to provide means for determining the amount of water in gasoline tanks, for instance, or fuel oil tanks or the like. Another object is to provide such means which are simple to operate and easily transportable. Further objects will become apparent in the following specification and the accompanying drawing, in which Fig. 1 is an outside view of the device embodying a preferred form of the invention;

Fig. 2 is a longitudinal sectional view taken along the plane of line 2—2 in Fig. 1; and Fig. 3 is a cross sectional view along the plane of line 3—3 in Fig. 2.

Like characters denote similar parts throughout the several views and the following specification.

10 is a glass cylinder, having a top flange 11 and a bottom flange 12. The top flange is recessed for the glass cylinder 10 at 13 and provided with a central outwardly projecting tubular extension 14 externally threaded to receive a coupling nut 15 which serves to hold fluid tightly against the face of the extension which is tapered in the usual manner, a pipe sleeve 16.

17 is a flexible hose, having one end forced over the pipe sleeve 16 and held there, preferably, by wiring 18 or other suitable means. To the other end of the hose is secured an air cock 19 of any commercial design.

20 are notches in the periphery of the top flange 11 within which are placed bolts 21 which are, preferably, threaded into the bottom flange 12, nuts 22 serving to force the glass cylinder 10 against gaskets 23 at both of its ends and against the top and bottom flanges, respectively, making thus a fluid tight joint.

The bottom flange 12 is provided with a central opening 24 and a conical valve seat 25. 26 is an outward extension at the bottom of the flange 12 which is provided with transversely disposed parts 27, and a central opening 28.

29 is a yoke at the top of the bottom flange 12, centrally disposed, having a central opening 30 in alignment with opening 28. Downwardly extending standards 31 of the yoke are bored out to receive screws 32 to fasten the yoke to the flange 12.

33 is a valve member, having a conical seat 34 engaging valve seat 25 and a top stem 35 slidingly engaging opening 30 of the yoke 29 and similarly a bottom stem 36 engaging opening 28 of the flange 12.

37 is a circularly wound light compression spring around top stem 35 of the valve 33 disposed between the yoke 29 and serves to keep the valve 33 against seat 25.

38 is a tube interposed between top flange 11 and bottom flange 12 within the glass cylinder 10 having oppositely disposed longitudinal slots 39. 40 is a wood float of special characteristics as will be explained more fully hereafter, which is slidingly disposed within the tube 38. The outside of tube 38 nearest the wall of the glass cylinder 10 is preferably graduated as indicated at 41 in Fig. 1.

The operation of the apparatus is as follows:

Should it be desired to make tests, for instance, to determine the amount of water in gasolene tanks, the operator takes the entire device by gripping it around the flexible hose 17, making sure that the air cock 19 is closed, and lowers it into the tank through the filling opening or manhole, whichever is the most convenient. As soon as the device reaches the bottom of the tank, or as soon as it is fixedly suspended in any desired intermediate position, the air cock 19 is opened. While the air cock 19 is closed, no liquid can enter the cylinder 10 because of the resistance of the air cushion therein. The pressure of the liquid will, as soon as the cock 19 is opened, however, overcome the slight tension of the spring 37 and open the valve 33 permitting the liquid to enter the glass cylinder 10. The air cock is then again closed and the device withdrawn from the tank, and the mixture therein allowed to settle.

If water should be present, it will settle at the bottom of the cylinder, while the gasolene will be at the top thereof on account of its lesser specific gravity.

The float 40, in case gasolene is to be tested for the presence of water, is made of walnut. This wood has a lesser specific gravity than water and a greater specific gravity than gasolene. It will therefore float on top of the water and indicate clearly the high level of the water which otherwise it would be difficult to observe on account of the identical color of water and gasolene. From the graduations the percentage of water in the test cylinder can then be read off and the water contents in the tank calculated therefrom.

Where, for instance, fuel oil tanks should be investigated for water, it is not necessary to employ the float 40, because the difference in color between these two liquids is so great as to be readily observable without it. It is obvious, of course, that the device can be employed for testing any combination of mixtures which have different specific gravities, and the float can be made of any suitable material which must be of lesser specific gravity than the heavier liquid and of greater specific gravity than the lighter liquid.

While we have described a workable embodiment of the invention, its construction, of course, may be greatly varied. The details shown are intended to be elementary only.

What we claim as new, is:

In an apparatus for testing contents of tanks containing liquids, an air tight vessel comprising a glass cylinder clamped between top and bottom members, flexible tubular means attached to the top member to lower the vessel into tanks, a valve at the end of the tubular means to control admission of atmospheric air into the vessel, a valve controlled inlet into the vessel in its bottom member adapted to be opened by the pressure of the liquids in the tanks when the said vessel is open to normal air pressure through the valve at the end of the tubular means, a slotted tube within the vessel and clamped between its top and bottom members, and a float adapted to travel within the said tube.

FRANK MARAS.
HYNEK MARAS.
EDWARD KOMAREK.